United States Patent
Steinbrecher et al.

(10) Patent No.: US 9,902,871 B2
(45) Date of Patent: *Feb. 27, 2018

(54) WATER-EMULSIFIABLE ISOCYANATES FOR COATINGS HAVING AN IMPROVED GLOSS

(71) Applicant: BASF SE, Ludwigshafen (DE)

(72) Inventors: Angelika Maria Steinbrecher, Cluj-Napoca (RO); Karl Haeberle, Speyer (DE); Frederic Lucas, Offenburg (DE)

(73) Assignee: BASF SE, Ludwigshafen (DE)

( * ) Notice: Subject to any disclaimer, the term of this patent is extended or adjusted under 35 U.S.C. 154(b) by 14 days.

This patent is subject to a terminal disclaimer.

(21) Appl. No.: 14/888,283

(22) PCT Filed: Apr. 22, 2014

(86) PCT No.: PCT/EP2014/058124
§ 371 (c)(1),
(2) Date: Oct. 30, 2015

(87) PCT Pub. No.: WO2014/177421
PCT Pub. Date: Nov. 6, 2014

(65) Prior Publication Data
US 2016/0075912 A1   Mar. 17, 2016

(30) Foreign Application Priority Data

May 2, 2013  (EP) .................... 13166174

(51) Int. Cl.

| | | |
|---|---|---|
| *C09D 175/08* | (2006.01) |
| *C08G 18/52* | (2006.01) |
| *C08G 18/58* | (2006.01) |
| *C08G 18/64* | (2006.01) |
| *C08G 18/70* | (2006.01) |
| *C08G 18/08* | (2006.01) |
| *C08G 18/28* | (2006.01) |
| *C09D 175/04* | (2006.01) |
| *C08G 18/38* | (2006.01) |
| *C08G 18/46* | (2006.01) |
| *C08J 3/24* | (2006.01) |
| *C08K 5/29* | (2006.01) |

(52) U.S. Cl.
CPC ....... *C09D 175/08* (2013.01); *C08G 18/0819* (2013.01); *C08G 18/0823* (2013.01); *C08G 18/283* (2013.01); *C08G 18/3863* (2013.01); *C08G 18/3868* (2013.01); *C08G 18/3872* (2013.01); *C08G 18/4676* (2013.01); *C08G 18/52* (2013.01); *C08G 18/585* (2013.01); *C08G 18/6453* (2013.01); *C08G 18/706* (2013.01); *C08J 3/24* (2013.01); *C08K 5/29* (2013.01); *C09D 175/04* (2013.01); *C08J 2333/00* (2013.01)

(58) Field of Classification Search
CPC ............ C08G 18/3863; C08G 18/3868; C08G 18/3872; C08G 18/3897; C09D 175/04; C09D 175/08
See application file for complete search history.

(56) References Cited

U.S. PATENT DOCUMENTS

| | | | |
|---|---|---|---|
| 3,479,310 A | 11/1969 | Dieterich et al. | |
| 4,092,286 A | 5/1978 | Noll et al. | |
| 4,108,814 A * | 8/1978 | Reiff .................. | C08G 18/0828 524/840 |
| 4,190,566 A | 2/1980 | Noll et al. | |
| 4,596,678 A | 6/1986 | Merger et al. | |
| 4,596,679 A | 6/1986 | Hellbach et al. | |
| 4,803,246 A * | 2/1989 | Dietrich ............. | C08G 18/6258 525/124 |
| 5,087,739 A | 2/1992 | Bohmholdt et al. | |
| 5,115,045 A * | 5/1992 | Gillis ................. | C08G 18/3256 252/182.26 |
| 5,252,696 A * | 10/1993 | Laas .................... | C08G 18/283 528/49 |
| 5,583,176 A * | 12/1996 | Haberle ............ | C08G 18/5072 524/590 |
| 8,742,166 B2 | 6/2014 | Lucas et al. | |
| 2006/0293485 A1* | 12/2006 | Rink ................... | C08F 283/006 528/44 |
| 2007/0010643 A1* | 1/2007 | Nefzger ................. | C08G 18/10 528/44 |
| 2009/0214795 A1* | 8/2009 | Jokisch .............. | C08G 18/3206 427/388.1 |
| 2010/0183883 A1* | 7/2010 | Schaefer ............ | C08G 18/0828 428/423.1 |
| 2010/0249310 A1* | 9/2010 | Spyrou .................. | C08G 18/10 524/500 |
| 2010/0256286 A1* | 10/2010 | Bernard ............. | C08G 18/3885 524/507 |
| 2012/0234205 A1* | 9/2012 | Hobbs .................... | C08G 75/12 106/287.26 |
| 2016/0060427 A1* | 3/2016 | Steinbrecher .......... | C08G 18/52 252/182.17 |
| 2016/0075912 A1* | 3/2016 | Steinbrecher .......... | C08G 18/52 524/839 |

FOREIGN PATENT DOCUMENTS

| | | |
|---|---|---|
| DE | 26 51 505 A1 | 5/1978 |
| DE | 27 32 131 A1 | 1/1979 |

(Continued)

OTHER PUBLICATIONS

Bakirova et al. Polymer Science Series D, 2012, vol. 5, No. 1, pp. 42-45.*

(Continued)

*Primary Examiner* — Michael A Salvitti
(74) *Attorney, Agent, or Firm* — Oblon, McClelland, Maier & Neustadt, L.L.P.

(57) ABSTRACT

The invention relates to new, water-emulsifiable isocyanates, to a process for preparing water-emulsifiable isocyanates, and to the use thereof.

20 Claims, No Drawings

(56) References Cited

FOREIGN PATENT DOCUMENTS

| | | |
|---|---|---|
| DE | 28 11 148 A1 | 9/1979 |
| DE | 40 10 783 A1 | 10/1991 |
| DE | 41 13 160 A1 | 10/1992 |
| DE | 42 03 510 A1 | 8/1993 |
| DE | 197 24 199 A1 | 12/1998 |
| DE | 198 22 890 A1 | 11/1999 |
| DE | 198 47 077 A1 | 11/1999 |
| DE | 199 58 170 A1 | 6/2001 |
| DE | 100 13 186 A1 | 9/2001 |
| DE | 100 13 187 A1 | 10/2001 |
| DE | 101 61 156 A1 | 6/2003 |
| EP | 0 126 299 A1 | 11/1984 |
| EP | 0 126 300 A1 | 11/1984 |
| EP | 0 206 059 A2 | 12/1986 |
| EP | 0 355 443 A2 | 2/1990 |
| EP | 0 486 881 A2 | 5/1992 |
| EP | 0 531 820 A1 | 3/1993 |
| EP | 0 540 985 A1 | 5/1993 |
| EP | 0 548 669 A2 | 6/1993 |
| EP | 0 582 166 A1 | 2/1994 |
| EP | 0 697 424 A1 | 2/1996 |
| EP | 0 703 255 A1 | 3/1996 |
| EP | 0 959 087 A1 | 11/1999 |
| EP | 1 616 925 A1 | 1/2006 |
| EP | 2 170 971 B1 | 2/2011 |
| GB | 1076688 A | 7/1967 |
| WO | WO 98/56843 | * 12/1998 |
| WO | WO 01/40347 A1 | 6/2001 |
| WO | WO 2004/022624 A1 | 3/2004 |
| WO | WO 2009/010469 A1 | 1/2009 |
| WO | WO 2009/156683 A1 | 12/2009 |
| WO | WO 2011/124710 A1 | 10/2011 |
| WO | WO 2012/007431 A1 | 1/2012 |
| WO | WO 2014/177642 A1 | 11/2014 |

OTHER PUBLICATIONS

English machine translation of WO 98/56843 to Treiber. Obtained from http://translationportal.epo.org on May 13, 2017.*
International Search Report dated Jul. 7, 2014 in PCT/EP2014/058124 (with English language translation).
U.S. Appl. No. 14/430,661, filed Mar. 24, 2015, US 2015/0225605 A1, Steinbrecher, et al.
U.S. Appl. No. 14/428,719, filed Mar. 17, 2015, US 2015/0225544 A1, Frederic Lucas, et al.

* cited by examiner

WATER-EMULSIFIABLE ISOCYANATES FOR COATINGS HAVING AN IMPROVED GLOSS

The invention relates to new, water-emulsifiable isocyanates, to a process for preparing water-emulsifiable isocyanates, and to the use thereof.

Water-emulsifiable polyisocyanates are added as crosslinking agents to aqueous polymer dispersions and have been much described in the literature. The emulsifiability in water is obtained by blending the polyisocyanates with emulsifiers themselves obtained by reacting the polyisocyanates with hydrophilic molecules.

Much in use as hydrophilic molecules are nonionic hydrophilic molecules such as polyalkylene oxide alcohols.

EP-A2 206 059 describes water-dispersible polyisocyanate preparations comprising an aliphatic polyisocyanate and a reaction product of an aliphatic polyisocyanate with a mono- or polyhydric, nonionic polyalkylene ether alcohol, with at least one polyether chain having at least 10 ethylene oxide units, as emulsifier. For suitable polyisocyanates, extensive lists of polyisocyanates based on aliphatic and cycloaliphatic diisocyanates are reported, more preferably isocyanurates and biurets based on 1,6-diisocyanatohexane (HDI) and/or isocyanurates based on 1-isocyanato-3,5,5-trimethyl-5-isocyanatomethylcyclohexane (IPDI).

EP-A1 540 985 likewise describes polyisocyanate mixtures, but here the polyether chains have an average of 5.0 to 9.9 ethylene oxide units.

EP-A2 486 881 describes nonaqueous aliphatic polyisocyanate preparations from a list of aliphatic polyisocyanates and a quantity, ensuring the dispersibility of the aliphatic polyisocyanate, of a reaction product of an aromatic or aliphatic diisocyanate and a monohydric or (less preferably) polyhydric polyalkylene ether alcohol having at least 8 ethylene oxide units in the polyether chain. Monofunctional polyethylene glycols exclusively are used in the examples. The reaction of the diisocyanates with the alcohols takes place in a ratio of 60 to 120 mol % in terms of OH groups relative to the NCO groups of the diisocyanate. The products obtained in this way then act as emulsifiers in the blends with polyisocyanates.

WO 01/40347 describes water-dispersible polyisocyanate mixtures with polyether chains containing an average of 5 to 33 ethylene oxide units and a defined fraction bonded via allophanate groups.

EP 959087 A1 describes water-emulsifiable, polyether-modified polyisocyanate mixtures in which a high proportion of the polyethers is bonded to the polyisocyanate via allophanate groups.

A disadvantage of this is that the formation of allophanate groups consumes, by reaction, two equivalents of isocyanate groups per hydroxyl group, and hence the NCO content of the product, measured relative to the reactant, is sharply reduced.

WO 2009/156683 discloses mixtures of water-dispersible polyisocyanates some of which carry ionic groups and some of which carry nonionic groups.

DE-A1 199 58 170 describes polyether-modified, water-dispersible polyisocyanate mixtures which have been modified with monohydric polyalkylene oxide polyether alcohols. Especially preferred are polyisocyanates or polyisocyanate mixtures with isocyanurate structure based on HDI, IPDI and/or 4,4'-diisocyanatodicyclohexylmethane.

DE-A1 198 22 890 describes aqueous, two-component polyurethane coating systems in which the curing component is prepared under allophanatization conditions from polyalkylene oxide polyether alcohols and from allophatically and/or cycloaliphatically bonded isocyanate groups, preferably isocyanurate structures based on HDI, IPDI and/or 4,4'-diisocyanatodicyclohexylmethane. The predominant bonding of polyether chains via allophanate groups is also known from DE-A1 198 47 077.

A disadvantage of the polyisocyanate mixtures described is that they fail to meet the requirements imposed on the gloss of the coatings obtainable using them.

Water-emulsifiable isocyanates can be dissolved in organic solvents such as carbonic esters or lactones, for example, for the purpose of improving their dispersibility, as described in EP-A 697 424.

WO 2004/22624 describes water-emulsifiable mixtures of polyisocyanates based on 1,6-hexamethylene diisocyanate with polyisocyanates based on isophorone diisocyanate, which exhibit not only high hardness but also good emulsifiability in water.

The drying properties of the coatings obtained with these coating compositions, however, are inadequate.

WO 2012/007431 describes high-functionality polyisocyanates which have urethane groups, and which are obtainable by reaction of at least one polyfunctional alcohol with at least one polyisocyanate in a molar ratio of NCO groups to OH groups of at least 3:1.

A disadvantage is that these high-functionality polyisocyanates having urethane groups are not water-emulsifiable.

WO 2011/124710 A describes coating compositions comprising hydroxyl-containing fatty acid glycerides, polyisocyanates, and binders.

The resulting coatings exhibit self-healing effects on heating.

A disadvantage is that the coating compositions, which represent a three-component system, are not water-emulsifiable.

The unpublished European patent application 12186603.2, filed Sep. 28, 2012, and the US provisional application filed on the same date, with the file reference 61/706,806, disclose improving the gloss of water-emulsifiable polyisocyanates through incorporation of polyols having a functionality of 2 to 4 and a number-average molar weight of at least 92 to 1500 g/mol, these polyols preferably being products of esterification of fatty acids with polyalcohols.

A disadvantage is that the esterification produces product mixtures which do not have a defined functionality but instead always have only a functionality with a scattering.

The following qualities are demanded by the user of a water-emulsifiable isocyanate:
1. The isocyanate is to be easy to emulsify; the mandatory use of demanding apparatus such as high-shear stirring elements, for example, is unwanted.
2. The emulsion is to be fine, since otherwise disruptions to the gloss, for example, or instances of clouding, may occur.
3. In the case of coatings, a high gloss is wanted.
4. The viscosity of the water-emulsifiable isocyanate is to be not too high.

It was an object of the present invention to provide a process for preparing water-emulsifiable polyisocyanates which exhibit good emulsifiability properties, have a viscosity at 23° C. of not more than 15 Pas, and can be used to obtain coatings with high gloss.

The object has been achieved by means of water-emulsifiable polyisocyanates comprising
(A) at least one polyisocyanate based on at least one (cyclo)aliphatic diisocyanate, (B) at least one compound (B) having at least two, preferably two to four, more preferably two to three, and very preferably precisely two isocyanate-reactive groups, comprising at least one group selected from the group consisting of thioether groups (—S—), selanyl groups (—Se—), sulfoxide groups (—S(=O)—), and sulfone groups (—S(=O)$_2$—), (C) at least one compound having at least one isocyanate-reactive group and at least one dispersive group, and (D) optionally solvent(s), where the ratio of NCO groups in (A) to isocyanate-reactive groups in (B) and (C) is from at least 5:1 to 100:1, the ethylene oxide group content, calculated as 44 g/mol, based on the sum of (A), (B), and (C), is at least 12 wt. %, preferably at least 14, more preferably at least 15 wt. %, the amount of component (C) is at least 5 and up to 25 wt %, and the viscosity at 23° C. to DIN EN ISO 3219/A.3 in a cone/plate system with a shear rate of 1000 s$^{-1}$ is from 2500 mPas to 12 000 mPas.

These polyisocyanates display easy emulsifiability, lead to a stable and fine emulsion, and can be used to obtain coatings which exhibit high gloss. Component (B) has a defined functionality without variance and thus permits the construction of defined structures in the polyisocyanate.

The polyisocyanates (A) are oligomers of aliphatic or cycloaliphatic diisocyanates, dubbed (cyclo)aliphatic for short in this specification.

The NCO functionality of the polyisocyanates (A) is generally at least 1.8 and can be up to 8, preferably 1.8 to 5, and more preferably 2 to 4.

Polyisocyanates contemplated are polyisocyanates having isocyanurate groups, polyisocyanates having uretdione groups, polyisocyanates having biuret groups, polyisocyanates having urethane or allophanate groups, polyisocyanates comprising oxadiazinetrione groups or iminooxadiazinedione groups, or uretonimine-modified polyisocyanates based on linear or branched $C_4$-$C_{20}$-alkylene diisocyanates or cycloaliphatic diisocyanates having a total of 6 to 20 C atoms, or mixtures thereof.

The (cyclo)aliphatic diisocyanates are preferably isocyanates having 4 to 20 C atoms. Examples of typical diisocyanates are aliphatic diisocyanates such as tetramethylene diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate, trimethylhexane diisocyanate or tetramethylhexane diisocyanate, cycloaliphatic diisocyanates such as 1,4-, 1,3- or 1,2-diisocyanatocyclohexane, 4,4'- or 2,4'-di(isocyanatocyclohexyl)methane, 1-isocyanato-3,3,5-trimethyl-5-(isocyanatomethyl)cyclohexane (isophorone diisocyanate), 1,3- or 1,4-bis(isocyanatomethyl)cyclohexane, or 2,4- or 2,6-diisocyanato-1-methylcyclohexane, and also 3 (or 4),8 (or 9)-bis(isocyanatomethyl)tricyclo[5.2.1.0$^{2,6}$]decane isomer mixtures. Mixtures of said diisocyanates may also be present.

The diisocyanates which can be used preferably have an isocyanate group content (calculated as NCO, molecular weight=42 g/mol) of 10 to 60 wt. %, based on the diisocyanate (mixture), preferably 15 to 60 wt. %, and more preferably 20 to 55 wt. %.

Preference is given to aliphatic and/or cycloaliphatic—referred to collectively for the purposes of this specification as (cyclo)aliphatic—diisocyanates and polyisocyanates, examples being the abovementioned aliphatic and cycloaliphatic diisocyanates, or mixtures thereof.

Particular preference is given to hexamethylene diisocyanate, 1,3-bis(isocyanatomethyl)-cyclohexane, isophorone diisocyanate, and 4,4'- or 2,4'-di(isocyanatocyclohexyl)methane, very particular preference to isophorone diisocyanate and hexamethylene diisocyanate, and especial preference to hexamethylene diisocyanate.

Isophorone diisocyanate is usually in the form of a mixture, specifically a mixture of the cis and trans isomers, generally in a ratio of about 60:40 to 80:20 (w/w), preferably in a ratio of about 70:30 to 75:25, and more preferably in a ratio of about 75:25.

Dicyclohexylmethane 4,4'-diisocyanate may likewise be in the form of a mixture of the different cis and trans isomers.

Cycloaliphatic isocyanates are those which comprise at least one cycloaliphatic ring system.

Aliphatic isocyanates are those which comprise exclusively linear or branched chains, in other words acyclic compounds.

For the present invention it is possible to use not only those di- and polyisocyanates obtained by phosgenating the corresponding amines but also those prepared without the use of phosgene, i.e., by phosgene-free processes. According to EP-A-0 126 299 (U.S. Pat. No. 4,596,678), EP-A-126 300 (U.S. Pat. No. 4,596,679), and EP-A-355 443 (U.S. Pat. No. 5,087,739), for example, (cyclo)aliphatic diisocyanates, such as 1,6-hexamethylene diisocyanate (HDI), isomeric aliphatic diisocyanates having 6 carbon atoms in the alkylene radical, 4,4'- or 2,4'-di(isocyanatocyclohexyl)methane, and 1-isocyanato-3-isocyanatomethyl-3,5,5-trimethylcyclohexane (isophorone diisocyanate or IPDI), for example, can be prepared by reacting the (cyclo)aliphatic diamines with, for example, urea and alcohols to give (cyclo)aliphatic biscarbamic esters and subjecting said esters to thermal cleavage into the corresponding diisocyanates and alcohols. The synthesis takes place usually continuously in a circulation process and in the presence, optionally, of N-unsubstituted carbamic esters, dialkyl carbonates, and other by-products recycled from the reaction process. Di- or polyisocyanates obtained in this way generally have a very low or even unmeasurable fraction of chlorinated compounds, leading to favorable color numbers in the products.

In one embodiment of the present invention the di- and polyisocyanates (A) have a total hydrolyzable chlorine content of less than 200 ppm, preferably of less than 120 ppm, more preferably less than 80 ppm, very preferably less than 50 ppm, in particular less than 15 ppm, and especially less than 10 ppm. This can be measured by means, for example, of ASTM specification D4663-98. Of course, though, di- and polyisocyanates (A) having a higher chlorine content can also be used.

Further noteworthy are

1) Polyisocyanates having isocyanurate groups and derived from aliphatic and/or cycloaliphatic diisocyanates. Particular preference is given in this context to the corresponding aliphatic and/or cycloaliphatic isocyanatoisocyanurates and in particular to those based on hexamethylene diisocyanate and isophorone diisocyanate. The isocyanurates present are, in particular, tris-isocyanatoalkyl and/or tris-isocyanatocycloalkyl isocyanurates, which constitute cyclic trimers of the diisocyanates, or are mixtures with their higher homologs having more than one isocyanurate ring. The isocyanatoisocyanurates generally have an NCO content of 10 to 30 wt. %, in particular 15 to 25 wt. %, and an average NCO functionality of 2.6 to 8.

2) Uretdione diisocyanates with aliphatically and/or cycloaliphatically bonded isocyanate groups, preferably aliphatically and/or cycloaliphatically bonded, and in particular those derived from hexamethylene diisocyanate or isophorone diisocyanate. Uretdione diisocyanates are cyclic dimerization products of diisocyanates.

The uretdione diisocyanates can be used as a sole component or in a mixture with other polyisocyanates, particularly those specified under 1).

3) Polyisocyanates having biuret groups and having cycloaliphatically or aliphatically bonded, preferably cycloaliphatically or aliphatically bonded, isocyanate groups, especially tris(6-isocyanatohexyl)biuret or its mixtures with its higher homologs. These polyisocyanates having biuret groups generally have an NCO content of 18 to 22 wt. % and an average NCO functionality of 2.8 to 4.5.

4) Polyisocyanates having urethane and/or allophanate groups and having aliphatically or cycloaliphatically bonded, preferably aliphatically or cycloaliphatically bonded, isocyanate groups, such as may be obtained, for example, by reacting excess amounts of hexamethylene diisocyanate or of isophorone diisocyanate with mono- or polyhydric alcohols such as, for example, methanol, ethanol, isopropanol, n-propanol, n-butanol, isobutanol, sec-butanol, tert-butanol, n-hexanol, n-heptanol, n-octanol, n-decanol, n-dodecanol (lauryl alcohol), 2-ethylhexanol, n-pentanol, stearyl alcohol, cetyl alcohol, lauryl alcohol, ethylene glycol monomethyl ether, ethylene glycol monoethyl ether, 1,3-propanediol monomethyl ether, cyclopentanol, cyclohexanol, cyclooctanol, cyclododecanol, trimethyloipropane, neopentyl glycol, pentaerythritol, 1,4-butanediol, 1,6-hexanediol, 1,3-propanediol, 2-ethyl-1,3-propanediol, 2-methyl-1,3-propanediol, ethylene glycol, diethylene glycol, triethylene glycol, tetraethylene glycol, pentaethylene glycol, glycerol, 1,2-dihydroxypropane, 2,2-dimethyl-1,2-ethanediol, 1,2-butanediol, 1,4-butanediol, 3-methylpentane-1,5-diol, 2-ethylhexane-1,3-diol, 2,4-diethyloctane-1,3-diol, hydroxypivalic acid neopentyl glycol ester, ditrimethylolpropane, dipentaerythritol, 2,2-bis(4-hydroxycyclohexyl)propane, 1,1-, 1,2-, 1,3-, and 1,4-cyclohexanedimethanol, 1,2-, 1,3- or 1,4-cyclohexanediol or mixtures thereof. These polyisocyanates having urethane and/or allophanate groups generally have an NCO content of 12 to 20 wt. % and an average NCO functionality of 2.5 to 4.5.

5) Polyisocyanates comprising oxadiazinetrione groups, derived preferably from hexamethylene diisocyanate or isophorone diisocyanate. Polyisocyanates of this kind comprising oxadiazinetrione groups are accessible from diisocyanate and carbon dioxide.

6) Polyisocyanates comprising iminooxadiazinedione groups, derived preferably from hexamethylene diisocyanate or isophorone diisocyanate. Polyisocyanates of this kind comprising iminooxadiazinedione groups are preparable from diisocyanates by means of specific catalysts.

7) Uretonimine-modified polyisocyanates.

8) Carbodiimide-modified polyisocyanates.

9) Hyperbranched polyisocyanates, of the kind known for example from DE-A1 10013186 or DE-A1 10013187.

10) Polyurethane-polyisocyanate prepolymers, from di- and/or polyisocyanates with alcohols.

11) Polyurea-polyisocyanate prepolymers.

Polyisocyanates 1) to 11) may be used in a mixture, including optionally in a mixture with diisocyanates.

The polyisocyanates (A) may also be present at least partly in blocked form.

Groups suitable for the blocking of isocyanates are described in D. A. Wicks, Z. W. Wicks, Progress in Organic Coatings, 36, 148-172 (1999), 41, 1-83 (2001) and also 43, 131-140 (2001).

This is especially preferred when the coating compositions of the invention are to be used in one-component form.

Preferred compounds (A) are the urethanes, biurets, and isocyanurates, more preferably the isocyanurates, of 1,6-hexamethylene diisocyanate (HDI) or 1-isocyanato-3-isocyanato-methyl-3,5,5-trimethylcyclohexane, very preferably of 1,6-hexamethylene diisocyanate.

As an inevitable result of their preparation, polyisocyanates (A) may still have a small fraction of the parent monomeric diisocyanate—for example, up to 5 wt. %, more preferably up to 3 wt. %, very preferably up to 2, more particularly up to 1, especially up to 0.5, and even up to 0.25 wt. %.

The compound (B) comprises at least one compound having at least two, preferably two to four, more preferably two to three, and very preferably precisely two isocyanate-reactive groups, comprising at least one group selected from the group consisting of thioether groups (—S—), selanyl groups (—Se—), sulfoxide groups (—S(=O)—), and sulfone groups (—S(=O)$_2$—).

Examples of isocyanate-reactive groups in compound (B) are —OH, —SH, —SeH, —NH$_2$, or —NHR$^8$, in which R$^8$ may be hydrogen, methyl, ethyl, isopropyl, n-propyl, n-butyl, isobutyl, sec-butyl, or tert-butyl. The isocyanate-reactive groups in compound (B) are preferably —OH, —SH, or —NHR$^8$, more preferably —OH or —SH, and very preferably —OH.

The compounds (B) in accordance with the invention have at least one, for example one to four, preferably one to three, more preferably one to two, and very preferably precisely one thioether group (—S—) or selanyl group (—Se—) or oxidation products thereof, particularly sulfoxide groups (—S(=O)—) or sulfone groups (—S(=O)$_2$—).

A thioether group in the sense of the present specification means a moiety —S— which is substituted on both sides by (cyclo)aliphatic or aromatic carbons, preferably by (cyclo)aliphatic and more preferably aliphatic carbon atoms. By "(cyclo)aliphatic or aromatic carbon" is meant a carbon atom which is part of a (cyclo)aliphatic or aromatic radical, which may in turn itself be substituted by isocyanate-reactive groups. In one preferred embodiment both (cyclo)aliphatic or aromatic radicals are substituted by precisely one isocyanate-reactive group. Analogous definitions apply in respect of selanyl groups (—Se—), sulfoxide groups (—S(=O)—), and sulfone groups (—S(=O)$_2$—).

In one preferred embodiment component (B) is selected from the group consisting of compounds of the formula

(B1)

(B2)

(B3)

(B4)

in which
R$^4$ and R$^5$ independently of one another are each C$_1$-C$_{18}$ alkylene, or—optionally interrupted by one or more oxygen atoms and/or sulfur atoms—C$_2$-C$_{16}$ alkylene, C$_6$-C$_{12}$ arylene, or $C_5$-$C_{12}$ cycloalkyl, it being possible for each of the stated radicals to be substituted by functional groups, aryl, alkyl, aryloxy, alkyloxy, halogen, heteroatoms and/or heterocycles.

Preferably $R^4$ and $R^5$ independently of one another are each $C_1$-$C_{18}$ alkylene, $C_6$-$C_{12}$ arylene, or $C_5$-$C_{12}$ cycloalkyl, and more preferably independently of one another are each $C_1$-$C_{18}$ alkylene, and more particularly $C_2$-$C_6$ alkylene, the stated radicals being able to be substituted in each case by functional groups, aryl, alkyl, aryloxy, alkyloxy, halogen, heteroatoms and/or heterocycles, but with particular preference being unsubstituted.

More preferably $R^4$ and $R^5$ independently of one another are selected from the group consisting of 1,2-ethylene, 1,2-propylene, 1,3-propylene, 1,4-butylene, 1,5-pentylene, 1,6-hexylene, 2-methyl-1,3-propylene, 2-ethyl-1,3-propylene, 2,2-dimethyl-1,3-propylene, 2,2-dimethyl-1,4-butylene, 3-oxa-1,5-pentylene, 3,6-dioxa-1,8-octylene, 3,6,9-trioxa-1,11-undecylene, 1,1-, 1,2-, 1,3- or 1,4-cyclohexylene, 1,2- or 1,3-cyclopentylene, 1,2-, 1,3-, or 1,4-phenylene, and 4,4'-biphenylene. Very preferably $R^4$ and $R^5$ independently of one another are selected from the group consisting of 1,2-ethylene, 1,2-propylene, 1,3-propylene, 3-oxa-1,5-pentylene, and 1,4-phenylene. More particularly $R^4$ and $R^5$ independently of one another are 1,2-ethylene, 1,2-propylene, or 1,3-propylene, and especially are 1,2-ethylene.

In one preferred embodiment $R^4$ and $R^5$ are each identical.

Among the compounds (B1) to (B4), the compounds (B1) are preferred.

Component (B) is preferably 3-thiapentane-1,5-diol (thiodiglycol), 1,5-dimethyl-3-thiapentane-1,5-diol, 1-methyl-3-thiahexane-1,6-diol, 4-thiaheptane-1,7-diol, 4,4'-thiobis(6-tert-butyl-m-cresol), and 4,4'-dihydroxydiphenyl sulfide, more preferably 3-thiapentane-1,5-diol.

The amount of component (B) in the water-emulsifiable polyisocyanate of the invention is generally 0.5 to 15 wt. %, based on the sum of (A), (B), and (C), preferably 1 to 10 wt. %, more preferably 1.2 to 7, and very preferably 1.5 to 5 wt. %.

Component (C) comprises at least one, for example one to three, preferably one to two, and more preferably precisely one compound having at least one, preferably one or two, and more preferably precisely one isocyanate-reactive group and at least one, preferably precisely one, dispersive group.

The components in question may preferably be compounds (C1) or (C2).

Such compounds (C1) are represented, for example, by the general formula

RG-$R^6$-DG in which
RG is at least one isocyanate-reactive group,
DG is at least one dispersive group, and
$R^6$ is an aliphatic, cycloaliphatic, or aromatic radical comprising 1 to 20 carbon atoms.

Examples of RG are —OH, —SH, —$NH_2$, or —$NHR^7$, in which $R^7$ may be hydrogen, methyl, ethyl, isopropyl, n-propyl, n-butyl, isobutyl, sec-butyl, or tert-butyl.

DG may be alternatively ionic, as for example anionic or cationic, or nonionic, preferably anionic or nonionic, and more preferably nonionic.

In the case of anionic groups, examples of DG are —COOH, —$SO_3H$, —$OPO_3H$, or —$PO_3H$, and also anionic forms thereof, which may be associated with any desired counterion, examples being $Li^+$, $Na^+$, $K^+$, $Cs^+$, $Mg^{2+}$, $Ca^{2+}$, $Ba^{2+}$, ammonium, methylammonium, dimethylammonium, trimethylammonium, ethylammonium, diethylammonium, triethylammonium, tributylammonium, diisopropylethylammonium, benzyldimethylammonium, piperidinium, piperazinium, N,N'-dimethylpiperazinium, dimethylcyclohexylammonium, methyldicyclohexylammonium, morpholinium, or pyridinium, preferably $Li^+$, $Na^+$, $K^+$, $Cs^+$, $Mg^{2+}$, $Ca^{2+}$, $Ba^{2+}$, ammonium, methylammonium, dimethylammonium, trimethylammonium, ethylammonium, diethylammonium, triethylammonium, tributylammonium, diisopropylethylammonium, benzyldimethylammonium, piperidinium, piperazinium, N,N'-dimethylpiperazinium, dimethylcyclohexylammonium, methyldicyclohexylammonium, morpholinium, or pyridinium.

$R^6$ may for example be methylene, 1,2-ethylene, 1,2-propylene, 1,3-propylene, 1,2-butylene, 1,4-butylene, 1,3-butylene, 1,6-hexylene, 1,8-octylene, 1,12-dodecylene, 1,2-phenylene, 1,3-phenylene, 1,4-phenylene, 1,2-naphthylene, 1,3-naphthylene, 1,4-naphthylene, 1,6-naphthylene, 1,2-cyclopentylene, 1,3-cyclopentylene, 1,2-cyclohexylene, 1,3-cyclohexylene, or 1,4-cyclohexylene.

An anionic component (C1) of this kind is preferably, for example, mercaptoacetic acid, mercaptopropionic acid, thiolactic acid, mercaptosuccinic acid, glycine, iminodiacetic acid, sarcosine, alanine, β-alanine, leucine, isoleucine, aminobutyric acid, hydroxyacetic acid, hydroxypivalic acid, lactic acid, hydroxysuccinic acid, hydroxydecanoic acid, dimethylolpropionic acid, dimethylolbutyric acid, ethylenediaminetriacetic acid, hydroxydodecanoic acid, hydroxyhexadecanoic acid, 12-hydroxystearic acid, aminobenzenesulfonic acids substituted on the ring by alkyl, as described in WO 2009/010469, aminonaphthalenecarboxylic acid, hydroxyethanesulfonic acid, hydroxypropanesulfonic acid, mercaptoethanesulfonic acid, mercaptopropanesulfonic acid, aminomethanesulfonic acid, taurine, aminopropanesulfonic acid, N-alkyl-, -cycloalkyl-, or -aryl-substituted aminomethanesulfonic acids or aminopropanesulfonic acid, and also the alkali metal, alkaline earth metal, or ammonium salts thereof, and more preferably the stated monohydroxycarboxylic and -sulfonic acids and also monoaminocarboxylic and -sulfonic acids, more preferably 4-aminotoluene-2-sulfonic acid, N-cyclohexyl-2-aminoethanesulfonic acid, and N-cyclohexylamino-3-propanesulfonic acid.

For the preparation the aforementioned acids, if not already salts, are partly or fully neutralized, preferably with alkali metal salts or amines, preferably tertiary amines.

Compounds (C1) having cationic groups DG may comprise at least one group that is reactive toward isocyanate groups, and at least one hydrophilic group which is cationic or can be converted into a cationic group, and are, for example, compounds of the kind described in EP-A1 582 166, particularly from page 5, line 42 to page 8, line 22 and more particularly from page 9, line 19 to page 15, line 34 therein, or in EP-A1 531 820, particularly from page 3, line 21 to page 4, line 57 therein, or in DE-A1 42 03 510, particularly from page 3, line 49 to page 5, line 35 therein. For the purposes of the present disclosure, these specifications are hereby incorporated expressly by reference.

Compounds (C1) may comprise at least one, preferably precisely one group that is reactive toward isocyanate groups, and at least one, preferably precisely one hydrophilic group which is anionic or can be converted into an anionic group, and are, for example, compounds as described in EP-A1 703 255, particularly from page 3, line 54 to page 4, line 38 therein, in DE-A1 197 24 199, particularly from page 3, line 4 to line 30 therein, in DE-A1 40 10 783, particularly from column 3, lines 3 to 40 therein, in DE-A1 41 13 160, particularly from column 3, line 63 to column 4, line 4 therein, in WO 2009/010469 A1, particularly from page 8, line 41 to page 11, line 17 therein, and in EP-A2 548 669, particularly from page 4, line 50 to page 5, line 6 therein. For the purposes of the present disclosure, these specifications are hereby incorporated expressly by reference.

Preferred compounds (C1) are those in which DG is a nonionic group. These preferred compounds (C1) comprise at least one, preferably precisely one group that is reactive toward isocyanate groups, and at least one, preferably precisely one nonionic hydrophilic group.

This hydrophilic group comprises at least one monoalcohol having at least 7, preferably at least 10, ethylene oxide groups.

Generally speaking, component (C1) comprises not more than 30 ethylene oxide groups, preferably not more than 25, and more preferably not more than 20 ethylene oxide groups.

Ethylene oxide groups in this context are groups —CH$_2$—CH$_2$—O— which are installed in repetition in component (C1).

Suitable monools whose ethoxylated products can be used as components (C1) include methanol, ethanol, isopropanol, n-propanol, n-butanol, isobutanol, sec-butanol, tert-butanol, n-hexanol, n-heptanol, n-octanol, n-decanol, n-dodecanol (lauryl alcohol), 2-ethylhexanol, cyclopentanol, cyclohexanol, cyclooctanol, and cyclododecanol. The aforementioned C$_1$ to C4 alkanols are preferred, and methanol is particularly preferred.

Particularly preferred compounds (C1) are polyalkylene oxide polyether alcohols obtainable by alkoxylating monohydroxy compounds of the general formula

R$^1$—O—H or secondary monoamines of the general formula

R$^2$R$^3$N—H, in which
R$^1$, R$^2$, and R$^3$ independently of one another are each C1-C18 alkyl, C2-C18 alkyl uninterrupted or interrupted by one or more oxygen and/or sulfur atoms, or are C$_6$-C$_{12}$ aryl, C5-C12 cycloalkyl or a five- or six-membered heterocycle having oxygen, nitrogen and/or sulfur atoms, or R$^2$ and R$^3$ together form an unsaturated, saturated or aromatic ring uninterrupted or interrupted by one or more oxygen and/or sulfur atoms, it being possible for the radicals mentioned each to be substituted by functional groups, aryl, alkyl, aryloxy, alkyloxy, halogen, heteroatoms and/or heterocycles.

Preferably R$^1$ is C1 to C4 alkyl, i.e., methyl, ethyl, isopropyl, n-propyl, n-butyl, isobutyl, sec-butyl or tert-butyl; very preferably R$^1$ is methyl.

Examples of suitable monofunctional starter molecules may be saturated monoalcohols such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, cyclopentanol, the isomeric methylcyclohexanols or hydroxymethylcyclohexane, 3-ethyl-3-hydroxymethyloxetane, or tetrahydrofurfuryl alcohol; unsaturated alcohols such as allyl alcohol, 1,1-dimethylallylalcohol or oleyl alcohol, aromatic alcohols such as phenol, the isomeric cresols or methoxyphenols, araliphatic alcohols such as benzyl alcohol, anisyl alcohol or cinnamyl alcohol; secondary monoamines such as dimethylamine, diethylamine, dipropylamine, diisopropylamine, di-n-butylamine, diisobutylamine, bis(2-ethylhexyl)amine, N-methyl- and N-ethylcyclohexylamine or dicyclohexylamine, heterocyclic secondary amines such as morpholine, pyrrolidine, piperidine or 1H-pyrazole, and also amino alcohols such as 2-dimethylaminoethanol, 2-diethylaminoethanol, 2-diisopropylaminoethanol, 2-dibutylaminoethanol, 3-(dimethylamino)-1-propanol or 1-(dimethylamino)-2-propanol.

Preferred compounds (C1) are polyether alcohols based on polyalkylene oxide polyether alcohols prepared using saturated aliphatic or cycloaliphatic alcohols of the abovementioned type as initiator molecules. Very particular preference is given to those based on polyalkylene oxide polyether alcohols prepared using saturated aliphatic alcohols having 1 to 4 carbon atoms in the alkyl radical. Polyalkylene oxide polyether alcohols prepared starting from methanol are especially preferred.

The monohydric polyalkylene oxide polyether alcohols have on average generally from 7 to 30, preferably from 7 to 25, more preferably from 7 to 20, very preferably from 10 to 20 ethylene oxide units per molecule.

Preferred polyether alcohols (C1) are, therefore, compounds of the formula

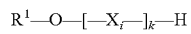

R$^1$—O—[—X$_i$—]$_k$—H in which
R$^1$ is as defined above,
k is an integer from 7 to 30, more preferably 7 to 25, and in particular 10 to 20, and each X for i=1 to k is —CH$_2$—CH$_2$—O—.

The polyether alcohols may further comprise, as hydrophilic synthesis components, minor amounts of other isocyanate-reactive compounds with anionic or cationic groups—for example, with carboxylate, sulfonate or ammonium groups. This, however, is less preferred.

Compounds (C2) are phosphoric esters of the formulae (Ia) or (Ib) or mixtures thereof:

in which
R$^{10}$ and R$^{11}$ independently of one another may be alkyl, preferably C$_1$ to C20 alkyl, cycloalkyl, preferably C$_4$ to C8 cycloalkyl, aryl, preferably C6 to C10 aryl, or aralkyl, preferably C7 to C15 aralkyl.

The groups R$^{10}$ and R$^{11}$ may also be interrupted by heteroatoms such as O, N, or S, but are not to carry any isocyanate-reactive groups such as NH, OH, SH, and COOH, for example.

Preferred compounds (C2) are monomethyl phosphate, dimethyl phosphate, monoethyl phosphate, diethyl phosphate, mono-n-butyl phosphate, di-n-butyl phosphate, mono-2-ethylhexyl phosphate, di-2-ethylhexyl phosphate, and mixtures thereof.

More preferably the radicals R$^{10}$ and R$^{11}$ derive from fatty acid alcohols or alkoxylated fatty acid alcohols, and are, for example, radicals of the general formula (II)

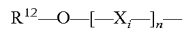

R$^{12}$—O—[—X$_i$—]$_n$— in which
R$^{12}$ is C$_1$ to C20 alkyl,
n is 0 (zero) or a positive integer from 1 to 20, and each $X_i$, for i=1 to n, independently of one another, may be selected from the group consisting of —$CH_2$—$CH_2$—O—, —$CH_2$—$CH(CH_3)$—O—, and —$CH(CH_3)$—$CH_2$—O—.

Where the compounds of the formulae (Ia) and (Ib) are used as mixtures, they are employed preferably in a molar ratio between monoester (Ib) and diester (Ia) of 5:95 to 95:5, preferably of 20:80 to 80:20, more preferably of 30:70 to 70:30, and more particularly of 33:67 to 67:33.

It is thought that in reaction of isocyanates with phosphoric esters of this kind, in each case one of the hydroxy groups of the phosphoric esters reacts with the NCO groups of the isocyanate in an addition reaction, with formation of a covalent bond.

Of the compounds (C1) and (C2), the compounds (C1) are preferred.

For preparing the water-emulsifiable polyisocyanates, at least part, and preferably the whole amount, of starting component (A) is reacted at temperatures of from 40 to 180° C., preferably 50 to 150° C., with at least part, preferably the total amount, of the compound (B) and/or (C).

The reaction takes place with observance of an equivalents ratio of NCO groups to isocyanate-reactive groups (total in (B) and (C)) of at least 5:1, preferably at least 7:1, and more preferably at least 10:1, and also up to 100:1, preferably up to 50:1, more preferably up to 30:1, very preferably up to 25:1, and more particularly up to 18:1.

It is also possible, although less preferable, first to react starting component (A) at least partly with (B) and only subsequently with (C), or, conversely, first to react starting component (A) at least partly with (C) and only subsequently with (B). Preference, however, is given to the simultaneous reaction of (A), (B), and (C).

The reaction mixture is reacted with component (C) in an amount such that the end product has an ethylene oxide group content, calculated as 44 g/mol, based on the sum of components (A), (B), and (C), of at least 12 wt. %, preferably at least 14 and more preferably at least 15 wt. %. The ethylene oxide group content generally does not exceed 25 wt. %, preferably not more than 23, more preferably not more than 20 wt. %.

The reaction time is generally 10 min to 5 hours, preferably 15 min to 4 hours, more preferably 20 to 180 min, and very preferably 30 to 120 min.

In order to accelerate the reaction it is possible optionally to use suitable catalysts.

The reaction is preferably accelerated by addition of a suitable catalyst. Such catalysts are known from the literature, as for example from G. Oertel (ed.), Polyurethane, 3rd edition, 1993, Carl Hanser Verlag, Munich—Vienna, pages 104 to 110, section 3.4.1. "Katalysatoren"; preferred are organic amines, especially tertiary aliphatic, cycloaliphatic, or aromatic amines, Brønsted acids and/or Lewis-acidic organometallic compounds; Lewis-acidic organometallic compounds are particularly preferred.

Further metal catalysts are described by Blank et al. in Progress in Organic Coatings, 1999, Vol. 35, pages 19-29.

Suitable catalysts are, in particular, zinc compounds, such as zinc(II) stearate, zinc(II) n-octanoate, zinc(II) 2-ethyl-1-hexanoate, zinc(II) naphthenate or zinc(II) acetylacetonate, tin compounds, such as tin(II) n-octanoate, tin(II) 2-ethyl-1-hexanoate, tin(II) laurate, dibutyltin oxide, dibutyltin dichloride, dibutyltin diacetate, dibutyltin dilaurate, dibutyltin dimaleate or dioctyltin diacetate, aluminum tri(acetoacetate), iron(III) chloride, potassium octoate, manganese compounds, cobalt compounds, bismuth compounds, Zn(II) compounds, Zr(IV) compounds or nickel compounds, and strong acids, such as trifluoroacetic acid, sulfuric acid, hydrogen chloride, hydrogen bromide, phosphoric acid or perchloric acid, for example, or any desired mixtures of these catalysts.

Preferred catalysts for the process of the invention are zinc compounds of the abovementioned type. Very particular preference is given to using zinc(II) n-octanoate, zinc(II) 2-ethyl-1-hexanoate and/or zinc(II) stearate.

Also possible are metal complexes such as acetylacetonates of iron, of titanium, of aluminum, of zirconium, of manganese, of nickel, of zinc, and of cobalt.

Tin-free and zinc-free alternatives used include, compounds of zirconium, of bismuth, of titanium, and of aluminum. Examples of these compounds are zirconium tetraacetylacetonate (e.g., K-KAT® 4205 from King Industries); zirconium dionate (e.g., K-KAT® XC-9213; XC-A 209 and XC-6212 from King Industries); and aluminum dionate (e.g., K-KAT® 5218 from King Industries).

Zinc compounds and bismuth compounds contemplated in this context include those in which the following anions are employed: $F^-$, $Cl^-$, $ClO^-$, $ClO_3^-$, $ClO_4^-$, $Br^-$, $I^-$, $IO_3^-$, $CN^-$, $OCN^-$, $NO_2^-$, $NO_3^-$, $HCO_3^-$, $CO_3^{2-}$, $S^{2-}$, $SH^-$, $HSO_3^-$, $SO_3^{2-}$, $HSO_4^-$, $SO_4^{2-}$, $S_2O_2^{2-}$, $S_2O_4^{2-}$, $S_2O_5^{2-}$, $S_2O_6^{2-}$, $S_2O_7^{2-}$, $S_2O_8^{2-}$, $H_2PO_2^-$, $H_2PO_4^-$, $HPO_4^{2-}$, $PO_4^{3-}$, $P_2O_7^{4-}$, $(OC_nH_{2n+1})^-$, $(C_nH_{2n-1}O_2)^-$, $(C_nH_{2n-3}O_2)^-$ and $(C_{n+1}H_{2n-2}O_4)^{2-}$, n standing for the numbers 1 to 20. Preference here is given to the carboxylates in which the anion conforms to the formulae $(C_nH_{2n-1}O_2)^-$ and $(C_{n+1}H_{2n-2}O_4)^{2-}$ with n being 1 to 20. Particularly preferred compounds have monocarboxylate anions of the general formula $(C_nH_{2n-1}O_2)^-$ where n stands for the numbers 1 to 20. Particularly noteworthy in this context are formate, acetate, propionate, hexanoate, neodecanoate, and 2-ethylhexanoate.

Among the zinc catalysts the zinc carboxylates are preferred, more preferably those of carboxylic acids which have at least two and up to twelve carbon atoms, more particularly zinc(II) diacetate or zinc(II) dioctoate or zinc(II) neodecanoate. Commercial catalysts are, for example, Borchi® Kat 22 from OMG Borchers GmbH, Langenfeld, Germany.

Of the bismuth catalysts the bismuth carboxylates are preferred, more preferably those of carboxylic acids which have at least two and up to twelve carbon atoms, more particularly bismuth octoates, 2-ethylhexanoates, neodecanoates, or pivalates; examples are K-KAT 348, XC-B221; XC-C227, XC 8203, and XK-601 from King Industries, TIB KAT 716, 716LA, 716XLA, 718, 720, 789, from TIB Chemicals, and those from Shepherd Lausanne, and also, for example, Borchi® Kat 24; 315; 320 from OMG Borchers GmbH, Langenfeld, Germany.

The catalysts in question may also be mixtures of different metals, such as in Borchi® Kat 0245 from OMG Borchers GmbH, Langenfeld, Germany, for example.

Among the titanium compounds the titanium tetraalkoxides $Ti(OR)_4$ are preferred, more preferably those derived from alcohols ROH having 1 to 8 carbon atoms, as for example methanol, ethanol, isopropanol, n-propanol, n-butanol, isobutanol, sec-butanol, tert-butanol, n-hexanol, n-heptanol, and n-octanol, preferably methanol, ethanol, isopropanol, n-propanol, n-butanol, and tert-butanol, more preferably isopropanol and n-butanol.

If at all, these catalysts are employed in an amount of 0.001 to 5 wt. %, preferably 0.005 to 1 wt. %, based on the overall weight of the reactants.

The polyaddition reaction for preparing the polyurethane formulation may take place with particular preference in the presence of cesium salts, as described in DE 10161156. Preferred cesium salts are compounds in which the following anions are employed: $F^-$, $Cl^-$, $ClO^-$, $ClO_3^-$, $ClO_4^-$, $Br^-$, $I^-$, $IO_3^-$, $CN^-$, $OCN^-$, $NO_2^-$, $NO_3^-$, $HCO_3^-$, $CO_3^{2-}$, $S^{2-}$, $SH^-$, $HSO_3^-$, $SO_3^{2-}$, $HSO_4^-$, $SO_4^{2-}$, $S_2O_2^{2-}$, $S_2O_4^{2-}$, $S_2O_5^{2-}$, $S_2O_6^{2-}$, $S_2O_7^{2-}$, $S_2O_8^{2-}$, $H_2PO_2^-$, $H_2PO_4^-$, $HPO_4^{2-}$, $PO_4^{3-}$, $P_2O_7^{4-}$, $(C_nH_{2n+1})^-$, $(C_nH_{2n-1}O_2)^-$, $(C_nH_{2n-3}O_2)^-$, and $(C_{n+1}H_{2n-2}O_4)^{2-}$, n standing for the numbers 1 to 20.

Particularly preferred compounds are cesium carboxylates in which the anion conforms to the formula $(C_nH_{2n-1}O_2)^-$ or $(C_{n+1}H_{2n-2}O_4)^{2-}$ where n is 1 to 20. Especially preferred cesium salts have monocarboxylate anions of the general formula $(C_nH_{2n-1}O_2)^-$ where n stands for the numbers 1 to 20. Particular mention may be made here of formate, acetate, propionate, hexanoate, and 2-ethylhexanoate.

The cesium salts are used in amounts of 0.01 to 10 mmol of cesium salt per kg of solvent-free reaction mixture. They are preferably used in amounts of 0.05 to 2 mmol of cesium salt per kg of solvent-free reaction mixture.

The cesium salts can be added to the reaction mixture in solid form, but preferably in dissolved form. Suitable solvents are polar, aprotic solvents or else protic solvents. Particularly suitable besides water are also alcohols; especially suitable are polyols, such as are also used as synthesis units for polyurethanes, such as ethane-, propane-, and butanediols, for example. The use of the cesium salts makes it possible to carry out the polyaddition reaction under the customary conditions.

Addition to the reaction mixture may take place by any desired methods. Thus, for example, it is possible to admix the catalyst for optional concomitant use either to the polyisocyanate component (A), (B) and/or to the component (C) before the beginning of the actual reaction. It is also possible to add the catalyst to the reaction mixture at any time during the reaction.

In one preferred embodiment of the present invention, components (B) and (C) are bonded predominantly by urethane groups, whereas the bonding by allophanate groups is to make up the smaller part.

Relative to the hydroxyl groups reacted with an isocyanate in components (B) and (C), preferably more than 50 mol % are bonded via urethane groups, more preferably at least 60 mol %, very preferably at least 66 mol %, more particularly at least 75 mol %, especially at least 80 mol %, and even at least 90 mol %.

The reaction conditions are preferably selected, accordingly, so that less than 10 mol % of the hydroxyl groups in components (B) and (C) are bonded via allophanate groups in the product. This can be achieved for example by avoiding reaction conditions of the kind described in EP 959087 A1 for achieving a high allophanate content.

This can preferably be achieved by selecting, among the stated catalysts, those which form allophanate groups only to a small degree.

In particular, the formation of allophanate groups can be kept low by holding the reaction temperature, in the presence of a catalyst, at not more than 90° C., preferably not more than 85° C., and more preferably at not more than 80° C.

The course of the reaction can be monitored by determining the NCO content by means, for example, of titrimetry. When the target NCO content has been reached the reaction is terminated. In the case of a purely thermal reaction regime, this can be done, for example, by cooling the reaction mixture to room temperature. Where a catalyst of the aforementioned type is used, however, the reaction is generally stopped by adding suitable deactivators. Examples of suitable deactivators include organic or inorganic acids, the corresponding acid halides, and alkylating agents. Examples that may be mentioned include phosphoric acid, monochloroacetic acid, dodecylbenzenesulfonic acid, benzoyl chloride, dimethyl sulfate, and, preferably, dibutyl phosphate and also di-2-ethylhexyl phosphate. The deactivators can be used in amounts of 1 to 200 mol %, preferably 20 to 100 mol %, based on the moles of catalyst.

The resultant polyisocyanate mixtures generally have an NCO content of preferably 14.0 to 20.0 wt. %, more preferably 15.0 to 19.0 wt. %.

The resulting polyisocyanate mixtures generally have a viscosity at 23° C. of 2.5 to 12 Pas, more preferably 3 to 8 Pas.

In this specification the viscosity is reported, unless indicated otherwise, at 23° C. in accordance with DIN EN ISO 3219/A.3 in a cone/plate system with a shear rate of 1000 $s^{-1}$.

The process may be carried out optionally in a suitable solvent (D) which is inert toward isocyanate groups. Examples of suitable solvents are the conventional paint solvents known per se, such as ethyl acetate, butyl acetate, ethylene glycol monomethyl or monoethyl ether acetate, 1-methoxy-2-propyl acetate, 3-methoxy-n-butyl acetate, acetone, 2-butanone, isobutyl methyl ketone, 4-methyl-2-pentanone, cyclohexanone, cyclopentanone, toluene, xylene, chlorobenzene, white spirit, aromatics with relatively high degrees of substitution, such as are sold, for example, under the names Solventnaphtha®, Solvesso®, Shellsol®, Isopar®, Nappar® and Diasol®, propylene glycol diacetate, diethylene glycol dimethyl ether, dipropylene glycol dimethyl ether, diethylene glycol ethyl and butyl ether acetate, N-methylpyrrolidone, N-ethylpyrrolidone, and N-methylcaprolactam, and also, preferably, carbonic esters or lactones, which are specified in EP-A1 697 424, page 4 lines 4 to 32, more preferably dimethyl carbonate, diethyl carbonate, 1,2-ethylene carbonate and 1,2-propylene carbonate, lactones such as β-propiolactone, γ-butyrolactone, ε-caprolactone, and ε-methylcaprolactone, or else any desired mixtures of such solvents.

It is also possible first to prepare the isocyanates without solvent and then to use a solvent (D) to take up the product thus obtainable.

Based on the total mixture (sum of components (A), (B), and (C)), the solvent (D) may be present in amounts of 0 to 60 wt. %, preferably in amounts of 0 to 50 wt. %.

The mixtures may be dispersed preferably in water for the purpose of preparing aqueous dispersions; with particular preference, the mixtures are mixed into aqueous dispersions.

The polyisocyanate formulation is suitable for modifying aqueous coating materials (paint, protective coatings), for example for wood, wood veneer, paper, board, card, textile, leather, nonwoven, plastics surfaces, glass, ceramic, mineral building materials such as cement moldings and fiber cement slabs, metals, or coated metals, adhesive or impregnating compositions, for coloring, for example, based on aqueous dispersions or solutions with a solids content of 5 to 60 wt. %, preferably from 5 to 50 wt. %. Suitable coating materials include the aqueous dispersions, known per se, of homopolymers and copolymers of olefinically unsaturated monomers or polyurethanes or else solutions of natural substances, such as of casein, for example.

The polyisocyanate formulations are added to the aqueous coating materials generally in an amount of 1 to 25, preferably from 2.5 to 20 wt. %, based on the solids content of the coating material.

The polyisocyanate formulations may be used in one-component coating compositions, in the form of polyurethane dispersions, for example, or as a mixture with a hydroxyl-containing binder, as a two-component polyurethane coating composition.

They are applied to the substrate in a known manner by means, for example, of spraying at a rate of 5 to 500 g solids/m².

Suitable dispersions of homopolymers or copolymers of olefinically unsaturated monomers are, for example, conventional dispersions of homopolymers or copolymers based on vinyl esters of carboxylic acids having 2 to 18, preferably 2 to 4, carbon atoms such as vinyl acetate in particular, if desired with up to 70 wt. %, based on the total amount of olefinically unsaturated monomers, of other olefinically unsaturated monomers, and/or of homopolymers or copolymers of (meth)acrylic esters of alcohols having 1 to 18, preferably 1 to 4, carbon atoms, such as methyl, ethyl, propyl, n-butyl, hydroxyethyl or hydroxypropyl (meth)acrylates in particular, together if desired with up to 70 wt. % of other olefinically unsaturated monomers, and/or butadiene-styrene copolymers having a butadiene content of about 20 to 60 wt. %, and/or of other diene polymers or copolymers such as polybutadiene or copolymers of butadiene with other olefinically unsaturated monomers such as styrene, acrylonitrile and/or methacrylonitrile, for example, and/or aqueous dispersions of polymers or copolymers of 2-chloro-1,3-butadiene, if desired with other olefinically unsaturated monomers of the type exemplified above, e.g., those with a chlorine content of about 30 to 40 wt. %, in particular a chlorine content of about 36 wt. %.

Preference is given to aqueous dispersions of copolymers of 90 to 99.5 wt. % of acrylates or methacrylates of alkanols comprising 1 to 4 carbon atoms and 0.5 to 10 wt. %, based in each case on the copolymer, of hydroxyalkyl acrylates and methacrylates having 2 to 20 carbon atoms in the hydroxyalkyl radical, such as hydroxyethyl, hydroxypropyl or hydroxybutyl acrylate or methacrylate. Such dispersions are known per se and can be prepared conventionally by emulsion polymerization (see Houben-Weyl, Methoden der organischen Chemie, 4th edition, vol. E 20, p. 217 ff.).

Suitable aqueous polyurethane dispersions are those of the type known per se, as described in, for example, U.S. Pat. No. 3,479,310, GB-A 1,076,688, U.S. Pat. No. 4,108,814, U.S. Pat. No. 4,092,286, DE-A 2 651 505, U.S. Pat. No. 4,190,566, DE-A 2 732 131 or DE-A 2 811 148.

The aqueous dispersions used may comprise the customary auxiliaries and additives. These include, for example, fillers, such as quartz powder, quartz sand, highly disperse silica, heavy spar, calcium carbonate, chalk, dolomite or talc, which are often used together with suitable wetting agents such as polyphosphates, for example, such as sodium hexametaphosphate, naphthalenesulfonic acid, ammonium or sodium salts of polyacrylic acids, the wetting agents being added generally in amounts of 0.2 to 0.6 wt. %, based on filler.

Further suitable auxiliaries are organic thickeners to be used in amounts, for example, of 0.01 to 1 wt. %, based on the dispersion, such as cellulose derivatives, alginates, starch or starch derivatives or polyacrylic acid, or inorganic thickeners to be used in amounts of 0.05 to 5 wt. %, based on the dispersion, such as bentonites, for example, or organic thickeners such as polyurethane thickeners, for example.

Fungicides for preservation may also be added to the dispersions. These are employed generally in amounts of 0.02 to 1 wt. %, based on the dispersion. Examples of suitable fungicides are phenol and cresol derivatives and also organotin compounds.

Substrates for impregnation are, for example, synthetic or nonsynthetic fibers and/or nonwovens or woven fabrics thereof.

The mixtures can be dispersed very finely in aqueous dispersions. The resulting dispersions are very stable on storage. Moreover, less of the water-emulsifiable polyisocyanate need be added in order to set the desired properties of the dispersion or to achieve the desired properties during application.

The mixtures can of course be admixed with customary auxiliaries and additives of coatings technology. These include, for example, defoamers, thickeners, leveling assistants, pigments, emulsifiers, dispersing assistants, and also solvents. The desired processing viscosity is set by adding water.

To prepare the dispersions it is sufficient in the majority of cases to use simple emulsifying techniques, for example, with a mechanical stirrer, or else in many cases simple mixing of the two components by hand, in order to obtain dispersions having very good properties. Naturally it is also possible, however, to employ mixing techniques involving a relatively high shearing energy, such as jet dispersion, for example.

The coating materials comprising the mixtures may be used in particular as primers, surfacers, pigmented topcoat materials, and clearcoat materials in the sector of automotive refinish or the painting of large-size vehicles. The coating materials are particularly suitable for applications where particularly high application reliability, outdoor weathering stability, optical properties, solvent resistance, chemical resistance, and water resistance are required, such as in automotive refinishing and the painting of large-size vehicles.

The coating materials comprising the mixtures may be applied by any of a wide variety of spraying methods, such as, for example, air-pressure, airless or electrostatic spraying methods using one-component or two-component spraying units, or else by spraying, troweling, knife coating, brushing, rolling, roller coating, flow coating, laminating, in-mold coating or coextrusion.

The coatings are generally dried and cured under normal temperature conditions, i.e., without heating the coating. Alternatively, the mixtures may be used to produce coatings which following application are dried and cured at elevated temperature, e.g., at 40-250° C., preferably 40-150° C., and especially at 40 to 100° C.

The examples which follow are intended to illustrate the properties of the invention but without restricting it.

EXAMPLES

In this specification, unless indicated otherwise, parts are to be understood as meaning parts by weight.

Polyisocyanate A:

HDI isocyanurate having an NCO content of 22.2% and a viscosity of 2800 mPa*s at 23° C. (available commercially as Basonat® HI 100 from BASF SE, Ludwigshafen).

Polyether A:

Monofunctional polyethylene oxide, prepared starting from methanol and with potassium hydroxide catalysis, having an OH number of 112 (according to DIN 53240) and a molecular weight of 500 g/mol. The basic catalyst residues still present were subsequently neutralized with acetic acid and the product was desalted. The same procedure also removes potassium acetate that has formed.

Diols
  Thiodyglycol HP (from BASF SE, Ludwigshafen)
  1,5 Pentanediol
  Diethylene glycol Inventive Examples 1 to 3, Comparative Examples 4 to 7

100 g of polyisocyanate A, the amount of polyether A specified in the table, and the amount of the stated diol (B) specified in the table were mixed, heated, and reacted with one another. After 3 hours at 90° C. the reaction was discontinued when the stated NCO content was reached, corresponding to the complete formation of the urethane. The corresponding product had a viscosity at 23° C. as reported in the table.

| Example | Polyisocyanate amount (g) | Polyether amount (g) | Diol amount (g) | NCO content (%) | Viscosity (mPa · s) |
|---|---|---|---|---|---|
| 1 | 100 | 17.6 | 2.0 g thiodiglycol | 15.8 | 5500 |
| 2 | 100 | 17.6 | 2.5 g thiodiglycol | 15.0 | 8200 |
| 3 | 100 | 17.6 | 3.7 g thiodiglycol | 14.2 | 14 600 |
| 4 (comp.) | 100 | 17.6 | 0 | 17.0 | 2950 |
| 5 (comp.) | 100 | 17.6 | 3.1 g 1,5-pentanediol | 14.2 | 13 200 |
| 6 (comp.) | 100 | 17.6 | 3.2 g diethylene glycol | 14.1 | 22 500 |
| 7 (comp.) | 100 | 48.4 | 0 | 11.2 | 3850 |

Use Examples 100 g of Luhydran® S938T (acrylate-based aqueous polyol, available commercially from BASF SE, Ludwigshafen, OH number 100 mg KOH/g, 45% strength in water) were mixed with 2.5 g of butyl diglycol acetate and 6.7 g of butyl glycol acetate as film-forming assistants. Using 0.9 g of a 50% strength solution of dimethylethanolamine in water, the pH of the mixture was adjusted to 8.5. The application viscosity was adapted using 7.8 g of water and 0.52 g of BYK® 340 (from BYK) defoamer.

The polyisocyanates from the table above were diluted with dipropylene glycol dimethyl ether to a solids content of 80%.

These polyisocyanate solutions were added, in an amount corresponding to 1 NCO to 1 OH of the Luhydran, to 45 g of the polyol formulation, and the mixture was stirred by hand at 140 to 180 revolutions per minute with a wooden spatula for 20 seconds.

A bar coater was then used to draw down films onto card in a wet film thickness of 150 μm.

After curing had taken place at 60° C. for 30 minutes, the gloss was determined at an angle of 20° using a micro-TRI-gloss p apparatus from BYK.

| Example | Gloss (20°) |
|---|---|
| 1 | 54.6 |
| 2 | 59.4 |
| 3 | 71.8 |
| 4 (comparative) | 43.8 |
| 5 (comparative) | 51.0 |
| 6 (comparative) | 56.9 |
| 7 (comparative) | 49.6 |

The comparison of inventive examples 1 to 3 with comparative example 4 (same amount of polyether) shows a distinct improvement in the gloss when using the polyisocyanates of the invention.

In examples 3, 5, and 6, the same molar amount of different diols with the same chain length was used. Here again, a distinct improvement in the gloss is apparent through use of component (B) in the polyisocyanates of the invention.

In inventive example 3 and comparative example 7, equal molar amounts were used of OH components, which in comparative example 7 come exclusively from the polyether, with omission of the component (B) of the invention. Here again, a distinct improvement in the gloss is apparent through use of component (B) in the polyisocyanates of the invention.

The invention claimed is:

1. A water-emulsifiable polyisocyanate composition, comprising:
  (A) a polyisocyanate comprising at least one (cyclo) aliphatic diisocyanate,
  (B) a compound (B) comprising at least two isocyanate-reactive groups, and at least one group selected from the group consisting of a thioether group (—S—), a selanyl group (—Se—), a sulfoxide group (—S(=O)—), and a sulfone group (—S(=O)$_2$—),
  (C) a compound comprising an isocyanate-reactive group and a dispersive group, and
  (D) optionally a solvent,
wherein
  a ratio of NCO groups in (A) to isocyanate-reactive groups in (B) and (C) is from 5:1 to 100:1,
  an ethylene oxide group content, calculated as 44 g/mol, based on a sum of (A), (B), and (C), is at least 12 wt. %,
  an amount of component (C) is at least 5 and up to 25 wt. %, and
  the composition has a viscosity at 23° C. of from 2500 mPas to 12 000 mPas.

2. The water-emulsifiable polyisocyanate composition according to claim 1, wherein the at least one (cyclo) aliphatic diisocyanate is selected from the group consisting of hexamethylene diisocyanate, 1,3-bis(isocyanatomethyl)

cyclohexane, isophorone diisocyanate, 4,4'-di(isocyanatocyclohexyl)methane, and 2,4'-di(isocyanatocyclohexyl)methane.

3. The water-emulsifiable polyisocyanate composition according to claim 1, wherein the polyisocyanate is an isocyanurate of 1,6-hexamethylene diisocyanate.

4. The water-emulsifiable polyisocyanate composition according to claim 1, wherein the component (B) is selected from the group consisting of a compound of (B1), a compound of (B2), a compound of (B3), and a compound of (B4):

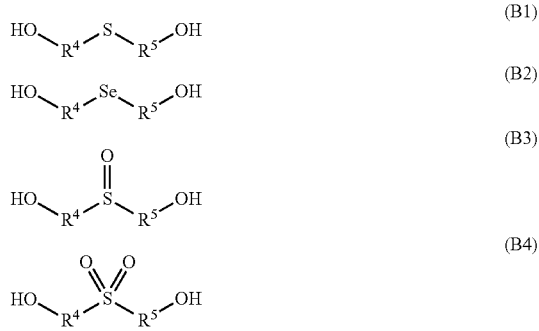

where
R$^4$ and R$^5$ independently are each C$_1$-C$_{18}$ alkylene, or—optionally interrupted by one or more oxygen atoms and/or sulfur atoms, —C$_2$-C$_{18}$ alkylene, C$_6$-C$_{12}$ arylene, or C$_5$-C$_{12}$ cycloalkyl, each of which is optionally substituted by a functional group, aryl, alkyl, aryloxy, alkyloxy, halogen, a heteroatom and/or a heterocycle.

5. The water-emulsifiable polyisocyanate composition according to claim 4, wherein R$^4$ and R$^5$ independently are selected from the group consisting of 1,2-ethylene, 1,2-propylene, 1,3-propylene, 1,4-butylene, 1,5-pentylene, 1,6-hexylene, 2-methyl-1,3-propylene, 2-ethyl-1,3-propylene, 2,2-dimethyl-1,3-propylene, 2,2-dimethyl-1,4-butylene, 3-oxa-1,5-pentylene, 3,6-dioxa-1,8-octylene, 3,6,9-trioxa-1,11-undecylene, 1,1-, 1,2-, 1,3- or 1,4-cyclohexylene, 1,2- or 1,3-cyclopentylene, 1,2-, 1,3-, or 1,4-phenylene, and 4,4'-biphenylene.

6. The water-emulsifiable polyisocyanate composition according to claim 1, wherein the component (B) is selected from the group consisting of 3-thiapentane-1,5-diol (thiodiglycol), 1,5-dimethyl-3-thiapentane-1,5-diol, 1-methyl-3-thiahexane-1,6-diol, 4-thiaheptane-1,7-diol, and 4,4'-dihydroxydiphenyl sulfide.

7. The water-emulsifiable polyisocyanate composition according to claim 1, wherein the compound (C) comprises a monoalcohol comprising at least 7 ethylene oxide groups.

8. The water-emulsifiable polyisocyanate composition according to claim 1, wherein the compound (C) comprises a compound of formula R$^1$—O—[—X$_i$]$_k$—H where
R$^1$ is C$_1$-C$_{18}$ alkyl, or—optionally interrupted by one or more oxygen atoms and/or sulfur atoms, —C$_2$-C$_{18}$ alkyl, C$_6$-C$_{12}$ aryl, C$_5$-C$_{12}$ cycloalkyl, or a five- to six-membered heterocycle comprising oxygen, nitrogen and/or sulfur atoms,
k is an integer of from 7 to 30, and each X$_i$, for i=1 to k, independently of one another, is —CH$_2$—CH$_2$—O—.

9. The water-emulsifiable polyisocyanate composition according to claim 1, wherein the compound (C) comprises one compound of formula

RG-R$^6$-DG where
RG is at least one isocyanate-reactive group,
DG is at least one dispersive group selected from the group consisting of —COOH, —SO$_3$H, —OPO$_3$H, and —PO$_3$H, and also an anionic form thereof, which optionally is associated with any desired counterion, and
R$^6$ is an aliphatic, cycloaliphatic, or aromatic radical comprising 1 to 20 carbon atoms.

10. The water-emulsifiable polyisocyanate composition according to claim 1, wherein the compound (C) is selected from the group consisting of mercaptoacetic acid, mercaptopropionic acid, thiolactic acid, mercaptosuccinic acid, glycine, iminodiacetic acid, sarcosine, alanine, β-alanine, leucine, isoleucine, aminobutyric acid, hydroxyacetic acid, hydroxypivalic acid, lactic acid, hydroxysuccinic acid, hydroxydecanoic acid, dimethylolpropionic acid, dimethylolbutyric acid, ethylenediaminetriacetic acid, hydroxydodecanoic acid, hydroxyhexadecanoic acid, 12-hydroxystearic acid, aminobenzenesulfonic acids substituted on the ring by alkyl, aminonaphthalenecarboxylic acid, hydroxyethanesulfonic acid, hydroxypropanesulfonic acid, mercaptoethanesulfonic acid, mercaptopropanesulfonic acid, aminomethanesulfonic acid, taurine, aminopropanesulfonic acid, N-alkyl-, -cycloalkyl-, or -aryl-substituted aminomethanesulfonic acid or aminopropanesulfonic acid, and an alkali metal, an alkaline earth metal, or an ammonium salt thereof.

11. The water-emulsifiable polyisocyanate composition according to claim 1, wherein the compound (C) is a phosphoric ester of formulae (Ia) or (Ib) or a mixture thereof

where
R$^{10}$ and R$^{11}$ independently are alkyl, cycloalkyl, aryl, or aralkyl.

12. A method for making a coating material, the method comprising:
incorporating the water-emulsifiable polyisocyanate composition according to claim 1 into the coating material, wherein the coating material is suitable for wood, wood veneer, paper, board, card, textile, leather, nonwoven, plastics surface, glass, ceramic, mineral building material, metal, or coated metal.

13. The water-emulsifiable polyisocyanate composition according to claim 1, wherein the compound (C) is a phosphoric ester of formulae (Ia) or (Ib) or a mixture thereof

-continued

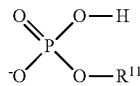
(Ib)

where
R$^{10}$ and R$^{11}$ have formula (II)

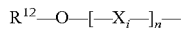
(II)

where
R$^{12}$ is C$_1$ to C$_{20}$ alkyl,
n is 0 or a positive integer from 1 to 20, and
each X$_i$, for i=1 to n, is independently selected from the group consisting of —CH$_2$—CH$_2$—O—, —CH$_2$—CH(CH$_3$)—O—, and —CH(CH$_3$)—CH$_2$—O—.

14. The water-emulsifiable polyisocyanate composition according to claim 1, wherein when the composition is applied to a substrate and cured to form a coating, the coating has a gloss determined at an angle of 20° of 54.6 to 71.8.

15. The water-emulsifiable polyisocyanate composition according to claim 1, which comprises 0.5 to 15 wt. %, based on the sum of (A), (B) and (C).

16. The water-emulsifiable polyisocyanate composition according to claim 1, which comprises 1 to 10 wt. %, based on the sum of (A), (B) and (C).

17. A water-emulsifiable polyisocyanate composition, comprising in at least partially reacted form:
(A) a polyisocyanate comprising at least one (cyclo) aliphatic diisocyanate,
(B) a compound (B) comprising at least two isocyanate-reactive groups, and at least one group selected from the group consisting of a thioether group (—S—), a selanyl group (—Se—), a sulfoxide group (—S(=O)—), and a sulfone group (—S(=O)$_2$—), and
(C) a compound comprising an isocyanate-reactive group and a dispersive group, wherein
a ratio of NCO groups in (A) to isocyanate-reactive groups in (B) and (C) is from 5:1 to 100:1,
an ethylene oxide group content, calculated as 44 g/mol, based on a sum of (A), (B), and (C), is at least 12 wt. %,
an amount of component (C) is at least 5 and up to 25 wt. %, and
the composition has a viscosity at 23° C. of from 2500 mPas to 12 000 mPas.

18. The water-emulsifiable polyisocyanate composition according to claim 17, which further comprises (D) a solvent.

19. A method for making a coating material, the method comprising:
incorporating the water-emulsifiable polyisocyanate composition according to claim 17 into the coating material,
wherein the coating material is suitable for wood, wood veneer, paper, board, card, textile, leather, nonwoven, plastics surface, glass, ceramic, mineral building material, metal, or coated metal.

20. The water-emulsifiable polyisocyanate composition according to claim 1, wherein the component (B) is selected from the group consisting of a compound of (B2), a compound of (B3), and a compound of (B4):

(B2)

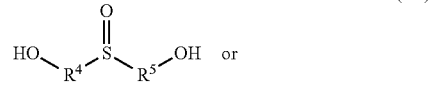
(B3)

or

(B4)

where
R$^4$ and R$^5$ independently are each C$_1$-C$_{18}$ alkylene, or—optionally interrupted by one or more oxygen atoms and/or sulfur atoms, —C$_2$-C$_{18}$ alkylene, C$_6$-C$_{12}$ arylene, or C$_5$-C$_{12}$ cycloalkyl, each of which is optionally substituted by a functional group, aryl, alkyl, aryloxy, alkyloxy, halogen, a heteroatom and/or a heterocycle.

* * * * *